US012160088B1

(12) United States Patent
Gozawa

(10) Patent No.: US 12,160,088 B1
(45) Date of Patent: Dec. 3, 2024

(54) SPARK PLUG

(71) Applicant: Niterra Co., Ltd., Nagoya (JP)

(72) Inventor: Tatsuya Gozawa, Nagoya (JP)

(73) Assignee: NITERRA CO., LTD., Nagoya (JP)

( * ) Notice: Subject to any disclaimer, the term of this patent is extended or adjusted under 35 U.S.C. 154(b) by 0 days.

(21) Appl. No.: 18/669,762

(22) Filed: May 21, 2024

(30) Foreign Application Priority Data

May 22, 2023 (JP) ................................ 2023-083621
Jan. 9, 2024 (JP) ................................ 2024-000940

(51) Int. Cl.
*H01T 13/34* (2006.01)

(52) U.S. Cl.
CPC .................................. *H01T 13/34* (2013.01)

(58) Field of Classification Search
CPC ...................................................... H01T 13/34
USPC ......................................................... 313/141
See application file for complete search history.

(56) References Cited

U.S. PATENT DOCUMENTS 10,833,486 B1 * 11/2020 Gozawa .................. H01T 13/39
11,183,818 B2 * 11/2021 Niessner ................ H01T 13/06
2005/0029915 A1 * 2/2005 Yorita ..................... H01T 13/39 313/142
2009/0066211 A1 * 3/2009 Hartmann ............... H01T 13/32 445/7
2012/0299459 A1 * 11/2012 Sakakura ................ H01T 13/54 445/3
2014/0015398 A1 * 1/2014 Sakakura .............. H01T 13/467 313/140
2016/0053733 A1 * 2/2016 Aochi ...................... H01T 13/20 313/120
2017/0234287 A1 * 8/2017 Masuda ................ F02P 15/006 123/594
2019/0103731 A1 * 4/2019 Tanaka .................... H01T 13/04
2020/0335949 A1 * 10/2020 Gozawa .................. H01T 13/39
2022/0077662 A1 3/2022 Shimamoto et al.

FOREIGN PATENT DOCUMENTS

JP 2016184558 A * 10/2016 ............. H01T 13/32
JP 2020-191160 A 11/2020

* cited by examiner

*Primary Examiner* — Christopher M Raabe
(74) *Attorney, Agent, or Firm* — KUSNER & JAFFE

(57) ABSTRACT

A spark plug includes: a cylindrical center electrode extending along an axial line; a metal shell that holds the center electrode in an insulated manner; and a ground electrode electrically connected to the metal shell. A spark gap is formed between a side surface of the center electrode and an end face of the ground electrode. The metal shell includes a tubular distal end portion inside which the spark gap is located. In a cross section perpendicular to the axial line and including a center of gravity of the end face, a distance between a center line of the ground electrode, the center line including the center of gravity, and a point of tangency of a tangent line to the side surface of the center electrode is greater than 0 and smaller than a distance between an edge of the end face and the center of gravity.

3 Claims, 5 Drawing Sheets

SPARK PLUG

FIELD OF THE INVENTION

The present invention relates to a spark plug in which a ground electrode is electrically connected to a metal shell.

BACKGROUND OF THE INVENTION

Japanese Unexamined Patent Application Publication No. 2020-191160PTL 1 discloses a spark plug including a center electrode, a metal shell that holds the center electrode in an insulated manner, and a ground electrode connected to the metal shell. In the spark plug, a spark gap formed between a side surface of the center electrode and an end face of the ground electrode is provided inside a tubular distal end portion of the metal shell.

SUMMARY OF THE INVENTION

There has been a demand for a technique for promoting flame propagation.

The present invention has been made to meet this demand, and an object thereof is to provide a spark plug in which flame propagation is promoted.

A spark plug according to a first aspect includes: a cylindrical center electrode extending along an axial line; a metal shell that holds the center electrode in an insulated manner; and a ground electrode electrically connected to the metal shell. A spark gap is formed between a side surface of the center electrode and an end face of the ground electrode. The metal shell includes a tubular distal end portion inside which the spark gap is located. In a cross section perpendicular to the axial line and including a center of gravity of the end face, a distance between a center line of the ground electrode, the center line including the center of gravity, and a point of tangency of a tangent line to the side surface of the center electrode is greater than 0 and smaller than a distance between an edge of the end face and the center of gravity.

In a second aspect, in the spark plug according to the first aspect, the distal end portion has a groove extending in a circumferential direction in an inner circumference thereof.

In a third aspect, in the spark plug according to the first or the second aspect, a shape of a cross section, perpendicular to the center line, of a portion of the ground electrode, the portion being located inside the distal end portion, is a polygonal shape with rounded corners, a circular shape, or an elliptical shape.

According to the present invention, in a cross section perpendicular to the axial line of the spark plug and including the center of gravity of the end face of the ground electrode, the distance between the center line of the ground electrode, the center line including the center of gravity, and a point of tangency of a tangent line to the side surface of the center electrode is greater than 0 and smaller than the distance between an edge of the end face and the center of gravity. Compared with the case where the distance between the center line of the ground electrode and the point of tangency is greater than the distance between the edge of the end face of the ground electrode and the center of gravity, the discharge points in the ground electrode and the center electrode are distributed, and thus, it is possible to reduce spark erosion of the ground electrode and the center electrode. Furthermore, because there is a difference in heat loss in the circumferential direction of the center electrode, flame propagation toward the side where heat loss is small is promoted.

DETAILED DESCRIPTION OF THE INVENTION

Figure 1:
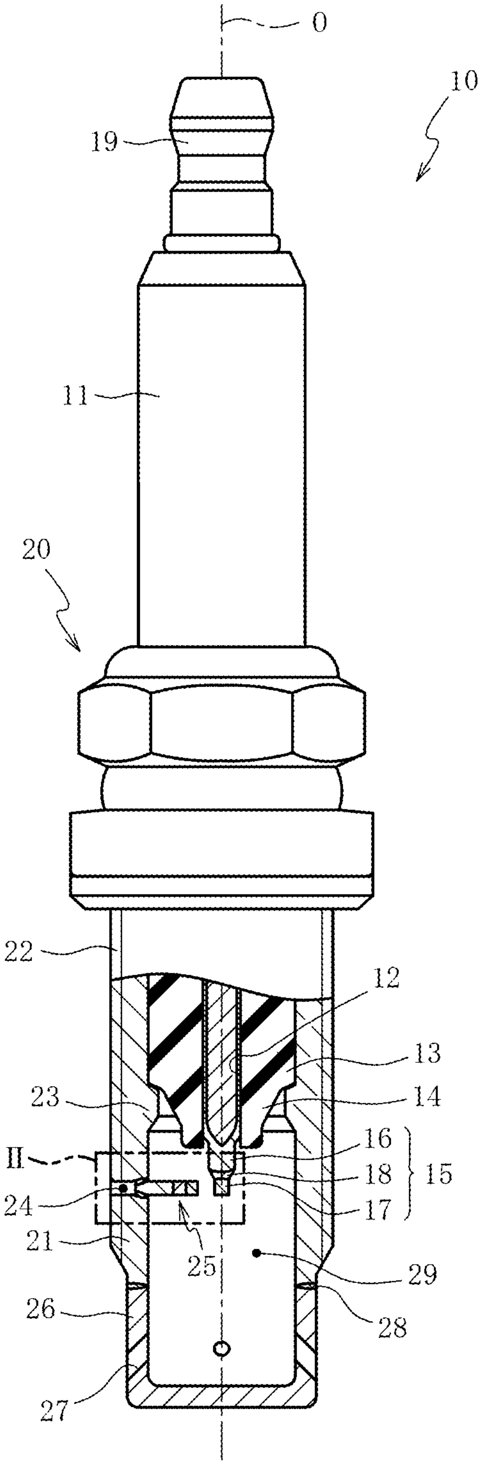
FIG. 1 is a partial sectional view of a spark plug according to an embodiment.

Hereinbelow, a preferred embodiment of the present invention will be described with reference to the accompanying drawings. FIG. 1 is a partial sectional view of a spark plug 10 according to an embodiment. FIG. 1 shows a cross section, including an axial line O, of a distal-side portion of the spark plug 10. In FIG. 1, the lower side of the drawing corresponds to the distal side of the spark plug 10, and the upper side of the drawing corresponds to the proximal side of the spark plug 10 (the same applies to FIGS. 2 and 3). As shown in FIG. 1, the spark plug 10 includes an insulator 11, a center electrode 15, a metal shell 20, and a ground electrode 25.

The insulator 11 is a substantially cylindrical member having an axial hole 12 extending along the axial line O. The insulator 11 is formed of ceramics, such as alumina, which is excellent in mechanical characteristics and insulation properties at high temperatures. The insulator 11 includes an engaging portion 13 and an end portion 14 adjacent to the distal side of the engaging portion 13. The outer diameter of the end portion 14 is smaller than that of the engaging portion 13.

The center electrode 15 is disposed in the axial hole 12, along the axial line O, so as to extend at least from the engaging portion 13 to the end portion 14 of the insulator 11. The center electrode 15 includes a rod-like base material 16 mainly composed of Ni, a tip 17 disposed at the distal end of the base material 16 and mainly composed of at least one of noble metals, such as Pt, Rh, Ru, and Ir, and a fused portion 18 that joins the tip 17 and the base material 16 to each other. The tip 17 and the fused portion 18 may be omitted.

The distal end of the center electrode 15 protrudes from the insulator 11 toward the distal side. The center electrode 15 is electrically connected to a metal terminal 19 inside the axial hole 12. The metal terminal 19 is a rod-like member to which an ignition system (not shown) is connected, and is formed of a conductive metal material (for example, low-carbon steel). The metal terminal 19 is fixed to the proximal end of the insulator 11.

The metal shell 20 is a substantially cylindrical member formed of a conductive metal material (for example, copper, a copper alloy, or low-carbon steel). The metal shell 20 is disposed on the outer circumference of the insulator 11. The metal shell 20 includes a cylindrical distal end portion 21 located on the outer circumferential side of at least the engaging portion 13 and the end portion 14 of the insulator 11. The distal end portion 21 has a male thread 22 on the outer circumference thereof and a step portion 23 on the inner circumference thereof. The male thread 22 is fitted into a female thread provided in a plug hole of an engine (not shown). The step portion 23 is located to the distal side of the engaging portion 13 of the insulator 11 to catch the engaging portion 13. The distal end portion 21 extends further toward the distal side than the end portion 14 of the insulator 11.

The distal end portion 21 has a hole 24, which is a recess provided in a part of the inner circumference of the distal end portion 21, at a portion closer to the distal end than the step portion 23. In this embodiment, the hole 24 has a circular cross section and radially penetrates through the distal end portion 21. The presence of the hole 24 makes a void in a part of the male thread 22. A part of the ground electrode 25 is disposed in the hole 24. The ground electrode 25 partially disposed in the hole 24 protrudes from the distal end portion 21 toward the center electrode 15.

A cap 26 closing the distal end of the metal shell 20 creates a space 29 inside the cap 26. The cap 26 is made of, for example, a metal material mainly composed of at least one of Fe, Ni, Cu, and the like. In this embodiment, the cap 26 is connected to the distal end of the distal end portion 21 via a fused portion 28. The cap 26 has through holes 27 communicating between the inside and the outside of the space 29.

Figure 2:
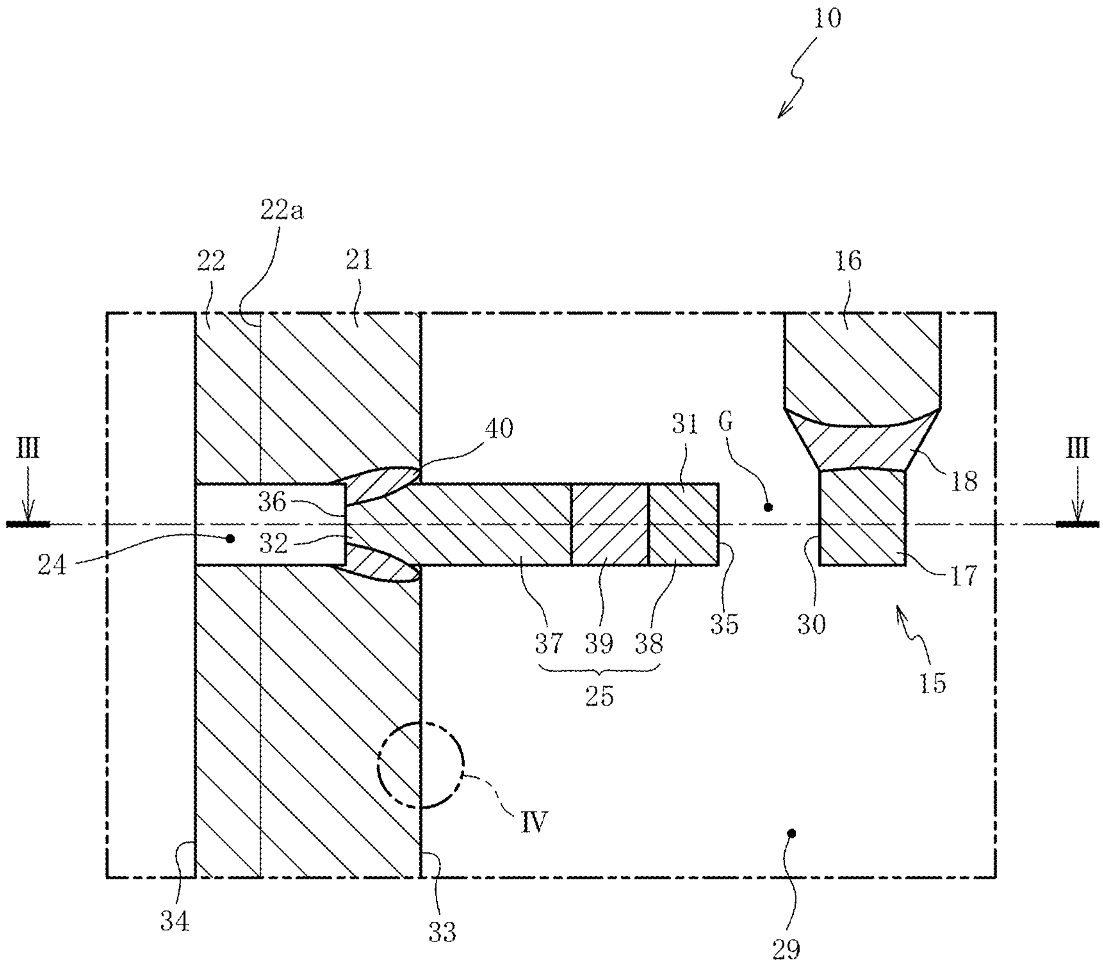
FIG. 2 is an enlarged sectional view of a portion II of the spark plug in FIG. 1.

FIG. 2 is an enlarged sectional view of a portion II of the spark plug 10 in FIG. 1. The ground electrode 25 is rod-shaped, and has one end 31 opposed to a side surface 30 of the center electrode 15 to form a spark gap G therebetween and the other end 32 disposed in the hole 24. The one end 31 is located inside an inner circumference 33 of the distal end portion 21. The one end 31 is cylindrical and has a circular cross section. The other end 32 is located inside an outer circumference 34 of the distal end portion 21, and inside a root 22*a* of the male thread 22. The other end 32 is cylindrical and has a circular cross section to fit into the hole 24. The hole 24 penetrating through the distal end portion 21 is closed by the other end 32. An end face 35 of the one end 31 of the ground electrode 25 is opposed to the side surface 30 of the center electrode 15, and an end face 36 of the other end 32 is located in the hole 24.

The ground electrode 25 includes a base material 37 mainly composed of, for example, Ni, a tip 38 mainly composed of at least one of noble metals, such as Pt, Rh, Ru, and Ir, and a fused portion 39 that joins the tip 38 and the base material 37 to each other. The one end 31 of the ground electrode 25 includes a part of the tip 38, and the other end 32 includes a part of the base material 37. The tip 38 and the fused portion 39 may be omitted.

The ground electrode 25 is connected to the distal end portion 21 via a fused portion 40 in the hole 24. The fused portion 40 is formed by irradiating the end face 36 of the ground electrode 25 disposed in the hole 24 with a laser beam. The fused portion 40 is a portion in which a portion including part of the end face 36 of the ground electrode 25 and a portion including part of the distal end portion 21 are fused together. In this embodiment, the fused portion 40 is continuous over the entire circumference of the end face 36 of the ground electrode 25.

Figure 3:
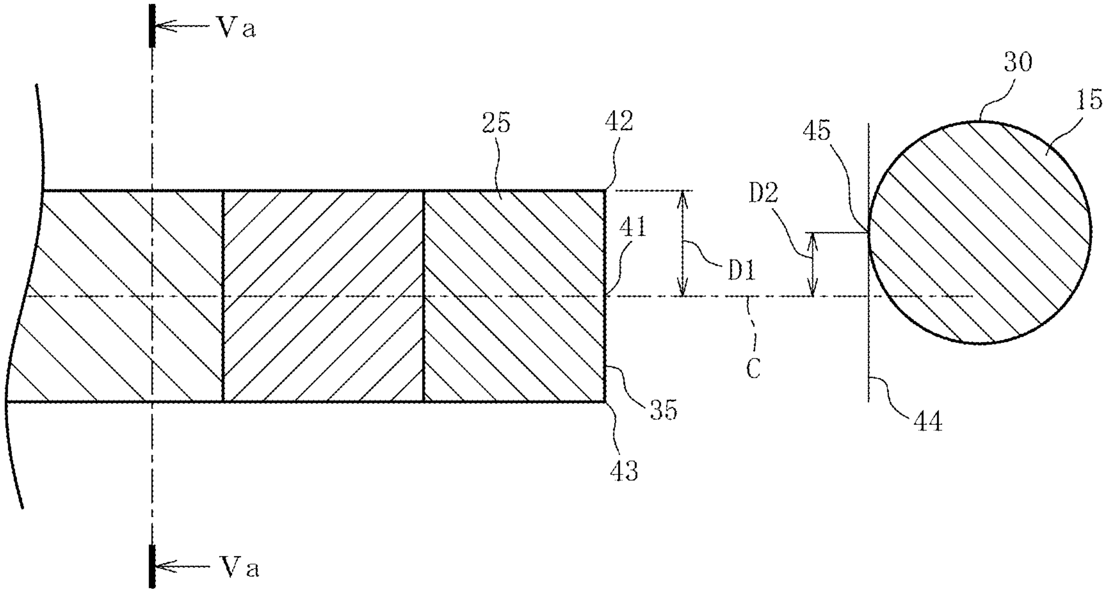
FIG. 3 is a sectional view of the spark plug taken along line III-III in FIG. 2.

FIG. 3 is a sectional view of the spark plug 10, taken along line III-III in FIG. 2. Line III-III in FIG. 2 is a straight line perpendicular to the axial line O (see FIG. 1) of the spark plug 10 and passes through a center of gravity 41 (see FIG. 3) of the end face 35 of the ground electrode 25. FIG. 3 shows a cross section perpendicular to the axial line O and including the center of gravity 41 of the end face 35 of the ground electrode 25. The center of gravity 41 of the end face 35 is a geometric center calculated by a known means when the end face 35 is regarded as a plane figure.

The center line C of the ground electrode 25 passing through the center of gravity 41 of the end face 35 is a straight line passing through the center of the cross section of the ground electrode 25 shown in FIG. 3. In this embodiment, the center line C and line III-III (see FIG. 2) coincide with each other. A tangent line 44 is a tangent line perpendicular to the center line C, among tangent lines to the side surface 30 of the center electrode 15. A distance D2 between the center line C and a point of tangency 45 of the tangent line 44 to the side surface 30 is greater than 0 and smaller than a distance D1 between an edge 42 of the end face 35 and the center of gravity 41. The distance D2 does not include 0, and is, for example, 0.02 mm or more.

The space 29 formed by the spark plug 10 (see FIG. 1) attached to the engine (not shown) is an auxiliary chamber provided in the combustion chamber of the engine. When the valve of the engine is operated, the fuel flows into the space 29 (auxiliary chamber) from the combustion chamber of the engine through the through holes 27. The spark plug 10 ignites the fuel by means of discharge between the center electrode 15 and the ground electrode 25. The point of tangency 45 on the side surface 30 of the center electrode 15 is located closer to one edge 42, of two edges 42 and 43 of the end face 35 of the ground electrode 25. Hence, in the ground electrode 25, the discharge start point (discharge point) is likely to occur near the edge 42 of the end face 35, where an electric field is concentrated. A flame kernel that has grown from ignition and through initial flame formation propagates, and combustion spreads in the space 29.

Meanwhile, a flame kernel generated by the discharge is subjected to heat loss due to the center electrode 15 and the ground electrode 25 and loses thermal energy. In the vicinity of the end face 35 of the ground electrode 25, the heat loss due to the center electrode 15 and the ground electrode 25 is smaller at a position farther from the center electrode 15. Thus, the heat loss is smaller at a position near the edge 43 of the end face 35 than at a position near the edge 42 of the end face 35 of the ground electrode 25. Because there is a difference in heat loss between the edges 42 and 43 of the end face 35, that is, in the circumferential direction of the center electrode 15, flame propagation, about the center electrode 15, toward the side where heat loss is small (counterclockwise in FIG. 3) is promoted.

Because the combustion spreads differently in the circumferential direction of the center electrode 15 with respect to the end face 35 of the ground electrode 25, a swirl flow (lateral rotational flow) about the center electrode 15 is generated in the space 29 (see FIG. 1). Due to expansion pressure generated by the combustion in the space 29, a gas flow containing flame is injected into the combustion chamber through the through holes 27. The fuel in the combustion chamber is combusted by the jet of the flame. Because the swirl flow generated in the space 29 increases the combustion speed of the fuel in the space 29, the ignition delay time, which is the time from when the flame is jetted from the space 29 into the combustion chamber to when the fuel in the combustion chamber is ignited, is reduced.

Furthermore, because of the swirl flow generated in the space 29, the flame propagates also to the upper portion of the space 29 (near the insulator 11), which is more distant from the through holes 27 than the end face 35 of the ground electrode 25. Thus, the uncombusted gas in the upper portion of the space 29 is easily combusted. Because the expansion pressure generated by the combustion in the space 29 is higher than that in the case where uncombusted gas remains in the upper part of the space 29, the speed of flame jetted from the space 29 into the combustion chamber is increased. Thus, the ignitability is improved.

In the discharge between the center electrode 15 and the ground electrode 25, the discharge point in the ground electrode 25 tends to occur near the edge 42 of the end face 35. If the discharge points in the ground electrode 25 and the center electrode 15 are concentrated on small areas, spark erosion of the ground electrode 25 and the center electrode 15 is locally significant. However, because the distance D2 between the center line C and the point of tangency 45 on the side surface 30 of the center electrode 15 is smaller than the distance D1 between the center of gravity 41 and the edge 42 of the end face 35 of the ground electrode 25, the discharge points in the ground electrode 25 and the center electrode 15 are distributed, compared with the case where the distance D2 is greater than the distance D1. Hence, it is possible to reduce local spark erosion of the ground electrode 25 and the center electrode 15.

Figure 4:
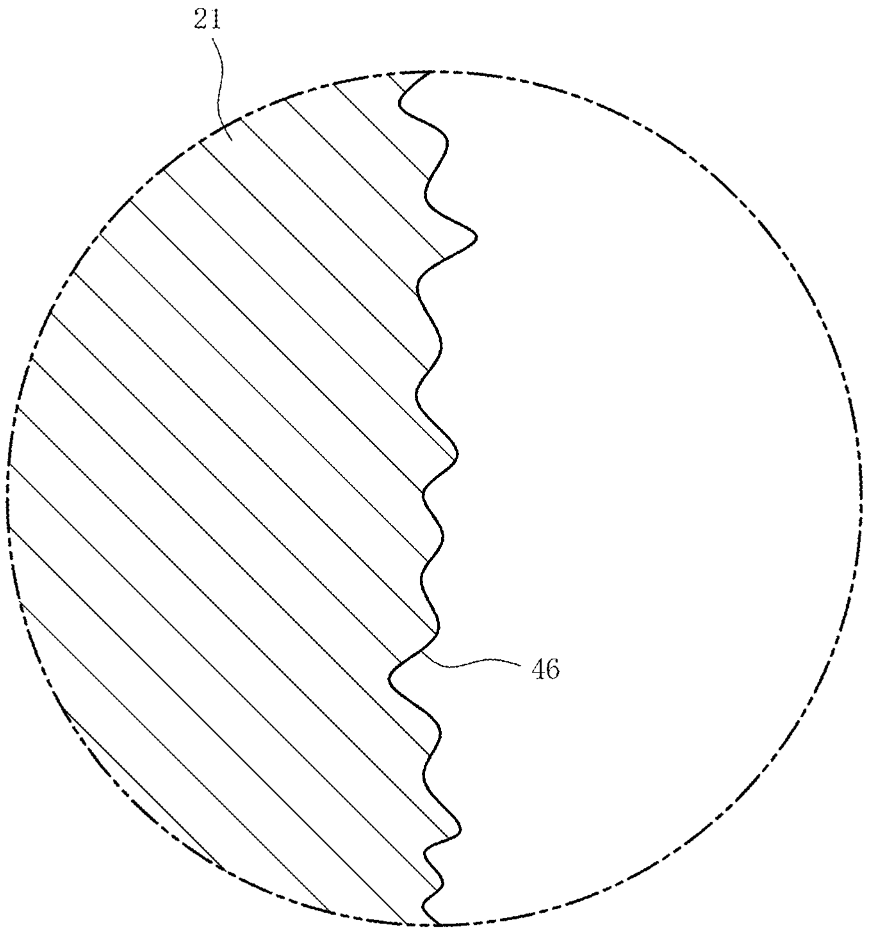
FIG. 4 is an enlarged sectional view of a portion IV of the spark plug in FIG. 2.

FIG. 4 is an enlarged sectional view of a portion IV of the inner circumference 33 of the distal end portion 21 of the spark plug 10 in FIG. 2. A groove 46 extending in the circumferential direction is provided in the inner circumference 33 of the distal end portion 21. The groove 46 is, for example, a polishing mark remaining after polishing the inner circumference 33 of the distal end portion 21 with a grindstone, or a tool mark remaining after cutting the inner circumference 33 with a cutting tool. The tool mark is formed around the rotation axis of a spindle of a lathe or the like when the inner circumference 33 of the distal end portion 21 is formed by cutting, in which a workpiece is rotated together with the spindle, and a cutting tool on a reciprocating table is brought into contact with the workpiece. Alternatively, the groove 46 may be formed by laser processing, in which the inner circumference 33 of the distal end portion 21 is irradiated with a laser beam while an assist gas is blown to remove a molten material.

In the spark plug 10, because the groove 46 provided in the inner circumference 33 of the distal end portion 21 extends in the circumferential direction, the resistance to the swirl flow swirling in the circumferential direction inside the distal end portion 21 is reduced. This further increases the combustion speed of the fuel in the space 29, as compared with a case where the groove 46 extending in the circumferential direction is not provided.

The groove 46 is provided in at least one of the distal side and the proximal side with respect to the position of the other end 32 of the ground electrode 25. The groove 46 provided on the distal side with respect to the position of the other end 32 can reduce the resistance to the swirl flow between the spark gap G and the through holes 27. The groove 46 provided on the proximal side with respect to the position of the other end 32 can reduce the resistance to the swirl flow in the upper portion of the space 29 (near the insulator 11).

A groove 46 extending in the circumferential direction may be provided in the inner surface of the cap 26. The groove 46 in the inner surface of the cap 26 can reduce the resistance to the swirl flow near the through holes 27. The groove 46 in the inner surface of the cap 26 is, for example, a polishing mark, a tool mark, or a groove formed by laser processing, as in the case of the groove 46 in the inner circumference 33 of the distal end portion 21. Alternatively, the cap 26 provided with the groove 46 may be formed by powder metallurgy.

Figure 5A:
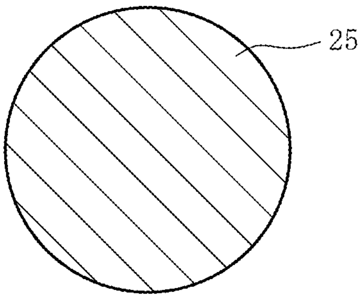
FIG. 5A is a sectional view of the ground electrode taken along line Va-Va in FIG. 3.

FIG. 5A is a sectional view of the ground electrode 25 taken along line Va-Va in FIG. 3. The cross section, taken perpendicular to the center line C, of a portion of the ground electrode 25 located inside the distal end portion 21 has a circular shape. Because the ground electrode 25 has a circular cross section, the ground electrode 25 is less likely to block the swirl flowing around the center electrode 15. Thus, the resistance of the ground electrode 25 to the swirl flow is low. By making the diameter of the one end 31 (see FIG. 2) of the ground electrode 25 smaller than the diameter of the other end 32, the resistance to the swirl flowing near the one end 31 of the ground electrode 25 is further reduced, compared with the case where the ground electrode 25 has a substantially constant diameter from the one end 31 to the other end 32.

Figure 5B:
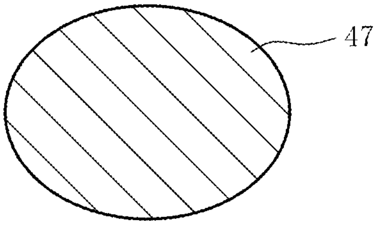
FIG. 5B is a sectional view of the ground electrode according to a modification.

FIG. 5B is a sectional view of a ground electrode 47 according to a modification. The ground electrode 47 is disposed at the distal end portion 21, instead of the ground electrode 25 of the spark plug 10. The cross section, taken perpendicular to the center line C, of a portion of the ground electrode 47 located inside the distal end portion 21 has an elliptical shape. Because the ground electrode 47 has an elliptical cross section, the ground electrode 47 is less likely to block the swirl flowing around the center electrode 15. Thus, the resistance of the ground electrode 47 to the swirl flow is low.

The ground electrode 47 is disposed such that the major axis of the elliptical cross section extends in the circumferential direction of the distal end portion 21, and the minor axis of the elliptical cross section extends in the axial direction of the distal end portion 21. Thus, the ground electrode 47 is less likely to block the swirl flowing around the center electrode 15, compared with the case where the major axis of the ellipse extends in the axial direction of the distal end portion 21. Thus, the resistance of the ground electrode 47 to the swirl flow is low.

Figure 5C:
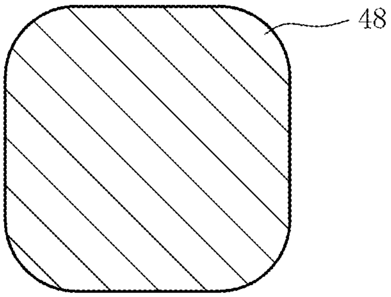
FIG. 5C is a sectional view of the ground electrode according to another modification.

FIG. 5C is a sectional view of a ground electrode 48 according to another modification. The ground electrode 48 is disposed at the distal end portion 21 instead of the ground electrode 25 of the spark plug 10. The cross section, taken perpendicular to the center line C, of a portion of the ground electrode 48 located inside the distal end portion 21 has a polygonal shape with rounded corners. In this embodiment, the cross section of the ground electrode 48 is a quadrangle with four rounded corners, but is not limited thereto. The polygonal shape of the cross section is appropriately selected from a triangle, a pentagon, a hexagon, and the like. Because the shape of the cross section of the ground electrode 48 is a polygonal shape with rounded corners, the ground electrode 48 is less likely to block the swirl flowing around the center electrode 15 than a ground electrode having an angular polygonal cross section. Thus, the resistance of the ground electrode 48 to the swirl flow is low.

Although the present invention has been described on the basis of the embodiment, the present invention is not limited to the embodiment, and it can be easily inferred that various improvements and modifications can be made without departing from the spirit of the present invention.

In the embodiment, the case where the center line C of the ground electrode 25 and the straight line (line III-III) perpendicular to the axial line O of the spark plug 10 coincide with each other has been described. However, the present invention is not necessarily limited thereto. The ground electrode 25 may of course be disposed such that the center line C of the ground electrode 25 and the axial line O of the spark plug 10 intersect at an angle with each other.

In the embodiment, the case where the ground electrode 25 is rod-shaped (linear) has been described. However, the invention is not necessarily limited thereto. It is of course possible to prepare a bent ground electrode 25 and connect an end of the ground electrode 25 to the metal shell 20 or the cap 26, so that the end face 35 of the ground electrode 25 is opposed to the side surface 30 of the center electrode 15.

In the embodiment, the case where the other end 32 of the ground electrode 25 is disposed in the hole 24 provided in the distal end portion 21 has been described. However, the present invention is not necessarily limited thereto. It is of course possible to join the other end 32 of the ground electrode 25 to the distal end portion 21 or the cap 26 without providing the hole 24.

In the embodiment, the case where the hole 24 is circular has been described. However, the present invention is not necessarily limited thereto. Other examples of the shape of the hole 24 include an ellipse, a semicircle, a polygon such as a triangle, a square, or a hexagon, and a polygon with rounded corners. The sectional shape of the ground electrode 25 to be disposed in the hole 24 is appropriately set so as to fit into the hole 24, in accordance with the shape of the hole 24.

In the embodiment, the case where the continuous fused portion 40 is provided around the center line of the hole 24 has been described. However, the present invention is not necessarily limited thereto. It is of course possible to provide an intermittent fused portion 40 around the center line of the hole 24, or to fix the ground electrode 25 into the hole 24 by press-fitting, instead of welding.

In the embodiment, the case where a part of the end face 36 of the ground electrode 25 remains unfused has been described. However, the present invention is not necessarily limited thereto. The entire end face 36 of the ground electrode 25 may be fused into the fused portion 40 until there is no end face 36.

In the embodiment, the case where the size of the hole 24 is constant in the radial direction of the distal end portion 21 has been described. However, the present invention is not necessarily limited thereto. For example, it is of course possible to provide, in the distal end portion 21, a hole that decreases in size from the outer side toward the inner side in the radial direction of the distal end portion 21 (i.e., a tapered hole) and dispose the ground electrode 25 in that hole, or to dispose the ground electrode 25 in the hole 24 provided with a counterbore in the outer circumference 34 of the distal end portion 21.

In the embodiment, the case where the hole 24 is provided in the male thread 22 in the distal end portion 21 has been described. However, the present invention is not necessarily limited thereto. For example, it is of course possible to provide the distal end portion 21 with a tubular portion having no male thread 22, make a hole in the tubular portion, and provide the ground electrode 25 therein.

In the embodiment, the case where the hole 24 penetrates through the distal end portion 21 has been described. However, the present invention is not necessarily limited thereto. This is because, even if the hole does not penetrate through the distal end portion 21, the other end 32 of the ground electrode 25 can be disposed in the hole as long as a part of the inner circumference 33 of the distal end portion 21 is recessed.

In the embodiment, the case where the other end 32 of the ground electrode 25 has substantially the same diameter as the one end 31 of the ground electrode 25 has been described. However, the present invention is not necessarily limited thereto. The one end 31 and the other end 32 of the ground electrode 25 may of course have different diameters.

In the embodiment, the case where the one end 31 and the other end 32 of the ground electrode 25 have the same sectional shape has been described. However, the present invention is not necessarily limited thereto. The one end 31 and the other end 32 may of course have different sectional shapes.

In the embodiment, the case where the cap 26 is disposed at the distal end of the distal end portion 21 of the metal shell 20 has been described. However, the present invention is not necessarily limited thereto. The cap 26 may course be omitted. This is because, even without the cap 26, if the one end 31 of the ground electrode 25 is surrounded by the distal end portion 21 of the metal shell 20, a flow circulating at the distal end portion 21 is generated.

In the embodiment, the case where the hemispherical cap 26 is disposed on the metal shell 20 has been described. However, the present invention is not necessarily limited thereto. The shape of the cap 26 may be set as appropriate. Other examples of the shape of the cap 26 include a bottomed cylindrical shape and a disk shape.

In the embodiment, the case where the cap 26 is welded to the metal shell 20 has been described. However, the present invention is not necessarily limited thereto. It is of course possible to prepare a tubular member having a cap at the distal end thereof and connect the tubular member to the metal shell 20 to form the space 29. The tubular member is closed by the cap at the distal end thereof and has, in the inner circumferential surface thereof, a female thread to be mated with the male thread 22 on the metal shell 20. The outer circumferential surface of the tubular member is provided with a male thread to be mated with a female thread in the plug hole of the engine. By mating the female thread in the tubular member with the male thread 22 on the metal shell 20, the cap is disposed at the distal end of the metal shell 20. The cap has the through holes 27.

The means for connecting the tubular member to the metal shell 20 to dispose the cap at the distal end of the metal shell 20 is not limited to the means in which the female thread in the inner circumferential surface of the tubular member is mated with the male thread 22 on the metal shell 20. The tubular member may of course be connected to the metal shell by other means. Examples of the other means include joining the tubular member and the metal shell by welding or the like. The tubular member is made of, for example, a metal material, such as a Ni-based alloy or stainless steel, or ceramics, such as silicon nitride.

DESCRIPTION OF REFERENCE NUMERALS

10 spark plug
15 center electrode
20 metal shell
21 distal end portion
25, 47, 48 ground electrode
30 side surface of center electrode
33 inner circumference of distal end portion
35 end face of ground electrode
41 center of gravity of end face
42 edge of end face
44 tangent line
45 point of tangency
46 groove
C center line
D1, D2 distance
G spark gap
O axial line

What is claimed is:

1. A spark plug comprising:

a cylindrical center electrode extending along an axial line;

a metal shell that holds the center electrode in an insulated manner; and a ground electrode electrically connected to the metal shell, a spark gap being formed between a side surface of the center electrode and an end face of the ground electrode, the metal shell including a tubular distal end portion inside which the spark gap is located, wherein, in a cross section perpendicular to the axial line and including a center of gravity of the end face, a distance between a center line of the ground electrode, the center line including the center of gravity, and a point of tangency of a tangent line to the side surface of the center electrode is greater than 0 and smaller than a distance between an edge of the end face and the center of gravity.

2. The spark plug according to claim 1, wherein the distal end portion has a groove extending in a circumferential direction in an inner circumference thereof.

3. The spark plug according to claim 1, wherein a shape of a cross section, perpendicular to the center line, of a portion of the ground electrode, the portion being located inside the distal end portion, is a polygonal shape with rounded corners, a circular shape, or an elliptical shape.

* * * * *